United States Patent
Lee et al.

(10) Patent No.: US 12,025,860 B2
(45) Date of Patent: Jul. 2, 2024

(54) PHOTONIC CRYSTAL COMPOSITES WITH VARIABLE STRUCTURAL COLOR AND MANUFACTURING METHOD THEREOF

(71) Applicant: YKMC, Inc., Asan-si (KR)

(72) Inventors: Hae Nyoung Lee, Cheonan-si (KR); Ji Hyun Park, Daegu-si (KR); Sung Youl Cho, Asan-si (KR); Ki Bum Jang, Pyeongtaek-si (KR)

(73) Assignee: YKMC, INC., Asan-si (KR)

( * ) Notice: Subject to any disclaimer, the term of this patent is extended or adjusted under 35 U.S.C. 154(b) by 0 days.

(21) Appl. No.: 17/889,331

(22) Filed: Aug. 16, 2022

(65) Prior Publication Data
US 2023/0103506 A1    Apr. 6, 2023

(30) Foreign Application Priority Data
Oct. 5, 2021 (KR) .................. 10-2021-0131819

(51) Int. Cl.
*G02F 1/00* (2006.01)
*C09K 9/02* (2006.01)
*G02F 1/01* (2006.01)

(52) U.S. Cl.
CPC .............. *G02F 1/0072* (2013.01); *C09K 9/02* (2013.01); *G02F 1/0128* (2013.01); C09K 2211/1425 (2013.01); C09K 2211/1466 (2013.01); *G02F 2202/022* (2013.01); *G02F 2202/32* (2013.01)

(58) Field of Classification Search
CPC ............... G02F 1/0072; G02F 1/0128; G02F 2202/022; G02F 2202/32; C09K 9/02; C09K 2211/1425; C09K 2211/1466
See application file for complete search history.

(56) References Cited

U.S. PATENT DOCUMENTS

2014/0124369 A1*  5/2014  Han .................. C09D 4/00
                                                    204/478

FOREIGN PATENT DOCUMENTS

| CN | 104959045 A | * 10/2015 | ............ B01D 67/00 |
| KR | 1020130110992 A | 10/2013 | |
| KR | 101832059 B1 | 2/2018 | |

OTHER PUBLICATIONS

Mahdieh Nemati, Abel Santos, Tushar Kumeria, and Dusan Losic, Label-Free Real-Time Quantification of Enzyme Levels by Interferometric Spectroscopy Combined with Gelatin-Modified Nanoporous Anodic Alumina Photonic Films Anal. Chem. 2015, 87, 9016-9024 (Year: 2015).*

Xiangling Xu, Gary Friedman, Keith D. Humfeld, Sara A. Majetich, and Sanford A. Asher, Synthesis and Utilization of Monodisperse Superparamagnetic Colloidal Particles for MagneticallyControllable Photonic Crystals, Chem. Mater. 2002, 14, 1249-1256 (Year: 2002).*

* cited by examiner

*Primary Examiner* — Bijan Ahvazi
(74) *Attorney, Agent, or Firm* — You & IP, LLC

(57) ABSTRACT

Disclosed are a structural color variable photonic crystal composite material and a method of manufacturing the same, and more particularly, a photonic crystal composite material having various changes in color by external stimulation and controlling the color change, and a method of manufacturing the same. The structural color variable photonic crystal composite material includes a metal having a metal oxide layer formed on its surface, wherein the metal oxide layer includes a plurality of pores, and a variable material that swells and contracts within the pores by external stimulation.

6 Claims, 2 Drawing Sheets

PHOTONIC CRYSTAL COMPOSITES WITH VARIABLE STRUCTURAL COLOR AND MANUFACTURING METHOD THEREOF

BACKGROUND

1. Field of the Invention

The present invention relates to a variable photonic crystal composite material capable of reversibly controlling color changes and a method of manufacturing the same.

2. Discussion of Related Art

A photonic crystal is a nanostructure formed by periodically arranging materials having different dielectric constants (or refractive indices), and has a characteristic of selectively reflecting light at a specific wavelength due to the periodic structure. Although most natural colors are determined by the intrinsic colors of materials, they sometimes appear by physical principles such as the diffraction and interference of light, and when the wavelength reflected by the photonic crystal structure is in the visible light region of 400 to 700 nm, it will take on color, this is called "structural color" (schemochromes), and it can be observed in nature (e.g., morpho butterfly wings, opalescence, etc.).

As research on structural color progresses, it is known that it is caused by a microstructure with periodicity, and various studies have been made to implement it.

For example, using a thin film of a plurality of layers, as the thickness of the thin film is adjusted, there is a technique for controlling the degree of interference of light to have a desired structural color. However, in the case of using such a technique, in order to implement various colors, there was a difficulty in adjusting the thickness of the thin film to have different thicknesses for each desired color.

In addition, there is a technique for forming a surface through anodizing treatment in the method shown in FIG. 1 and adjusting the color according to the anodizing condition, but there is a limit that the structural color cannot be changed after the anodization treatment is completed.

In addition, there is a method of implementing a structural color by anodizing surface treatment, but such anodizing surface treatment for producing a single color is a very inefficient method, and there is a problem in that it is not commercially viable.

RELATED ART DOCUMENT

Patent Document (Patent Document 1) Korean Patent Registration No. 10-1832059 (published on Feb. 23, 2018)
(Patent Document 2) Korean Patent Publication No. 10-2013-0110992 (published on Oct. 10, 2013)

SUMMARY OF THE INVENTION

In order to solve the problems of the existing structural color material, the present invention is to provide a photonic crystal composite material capable of reversibly changing color by external stimulation rather than having a fixed structural color, and controlling the color change, and a method of manufacturing the same.

In order to solve the above problems, the structural color variable photonic crystal composite material of the present invention may include: a metal having a metal oxide layer formed on its surface, wherein the metal oxide layer includes a plurality of pores, and a variable material that swells and contracts within the pores by external stimulation.

Another object of the present invention relates to a method of manufacturing a structural color variable photonic crystal composite material, including: a first step of surface-treating the surface of a metal to form a metal oxide layer and pores; and a second step of forming a variable material in the pores.

Effects of the Invention

Unlike conventional structural color materials, the structural color variable photonic crystal composite material of the present invention does not have a fixed structural color, and its color can be variously changed by external stimulation, and color control of the structural color that is expressed through external stimulation control is also possible. The structural color variable photonic crystal composite material of the present invention has the advantage that it can be used in various fields because it does not have a determined color after surface treatment and its color can be reversibly changed by external stimulation, has high strength due to being based on metal, and can be applied to various parts and materials such as buildings, automotives and home appliances.

DETAILED DESCRIPTION OF EXEMPLARY EMBODIMENTS

Hereinafter, the structural color variable photonic crystal composite material of the present invention will be described in more detail.

Figure 1:
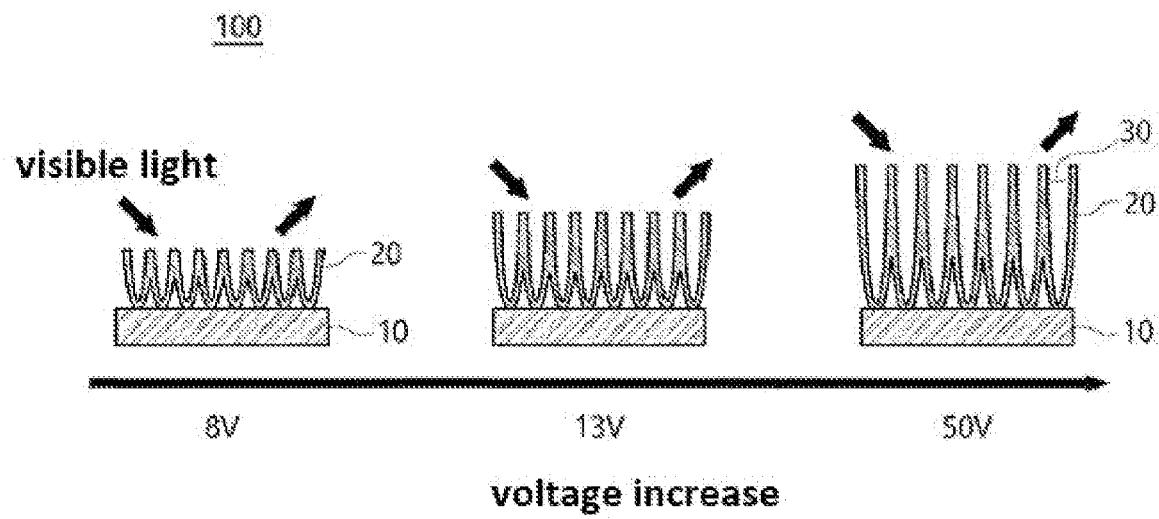
FIG. 1 is an example of manufacturing a structural color realization material by anodizing treatment through conventional electrode control.
Figure 2A:
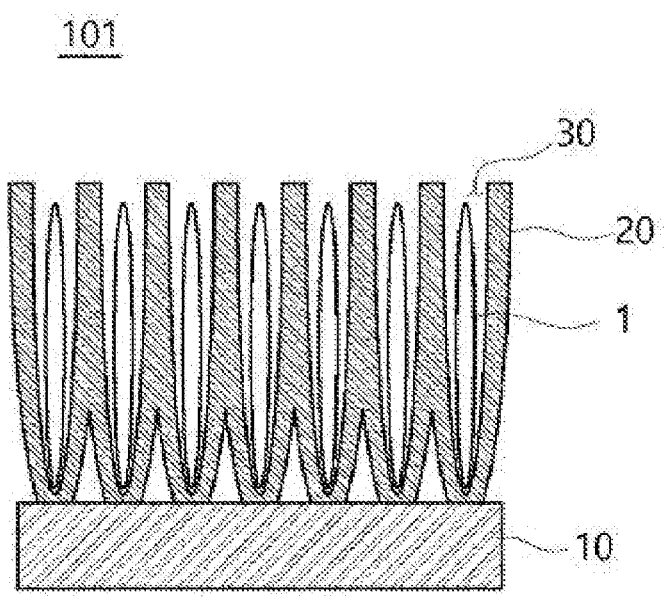
FIGS. 2A and 2B are schematic diagrams to help understand the structural color change mechanism of the structural color variable photonic crystal composite material of the present invention.
Figure 2B:
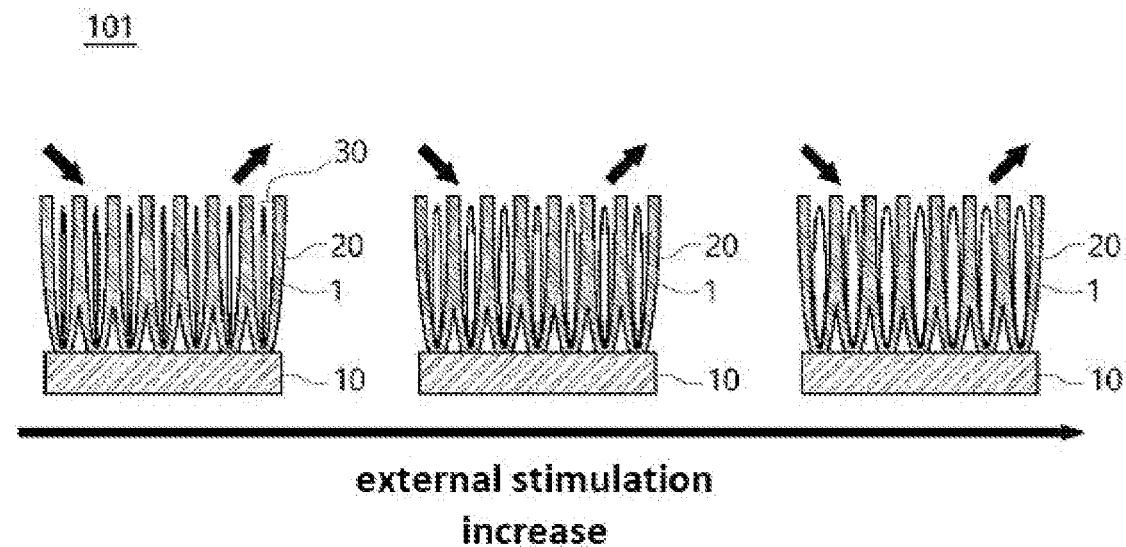
Figure 3:
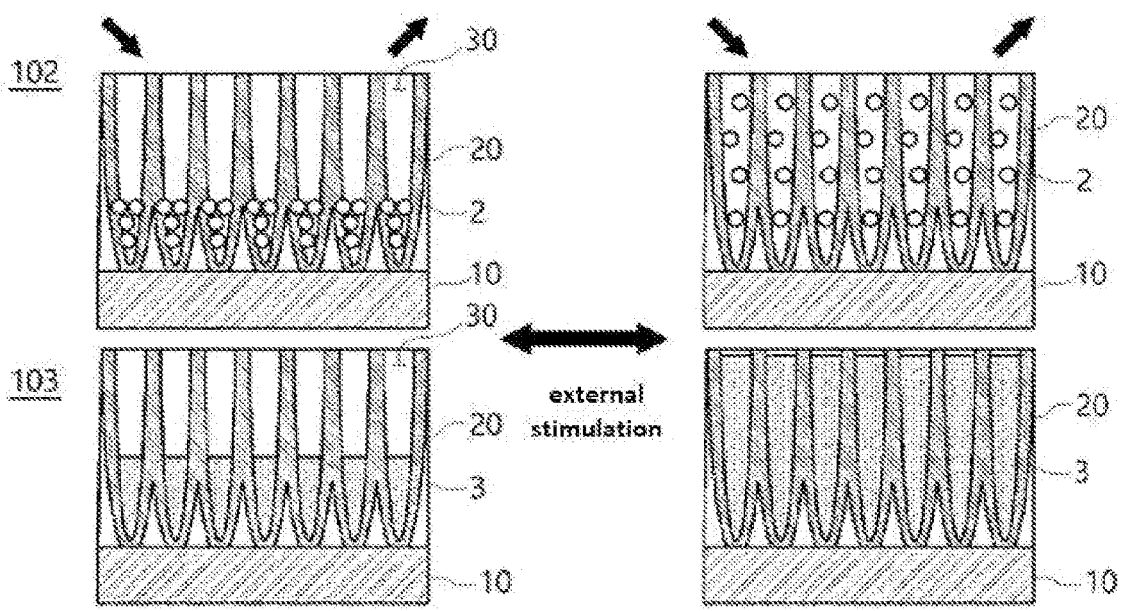
FIG. 3 is a schematic diagram to help understand the structural color change mechanism of the structural color variable photonic crystal composite material of the present invention.

The structured color variable photonic crystal composite material 101, 102, 103 is formed with a metal oxide layer 20 on the surface of a metal 10, as shown schematically in FIGS. 2A, wherein the metal oxide layer 20 is a porous layer including a plurality of pores 30, and includes a variable material 1, 2, 3 with mechanical deformation such as shrinkage and/or swelling inside the pores 30 by external stimulation. As schematically shown in FIGS. 2A, 2B and 3, various colors can be expressed by changing the structural color by mechanical deformation of the variable material in the pores by external stimulation.

At this time, the external stimulation means stimulation by one or two or more kinds of external stimuli selected from electricity, magnetism, temperature and humidity.

In the structural color variable photonic crystal composite material of the present invention, the metal includes one or more selected from aluminum, titanium, magnesium, and alloys thereof, preferably a titanium-based alloy may include one or more selected from ASTM B348 Ti grade 1, ASTM B348 Ti grade 2, ASTM B348 Ti grade 3, ASTM B348 Ti grade 4, Ti-6Al-4V (UNS designation R56400), Ti-13Nb-13Zr (UNS designation R58130), Ti-15Mo (UNS designation R58150), Ti-35.3Nb-5.1Ta-7.1Zr and Ti-29Nb-13Ta-4.6Zr, and an aluminum alloy may include one or more selected from Al1050, Al5052, Al5083, Al6041 and Al7075, but is not limited thereto.

In addition, the metal oxide layer is formed by oxidizing the metal during surface treatment, and is formed of an oxide of the metal. The thickness of the metal oxide layer can be controlled through a surface treatment method and/or surface treatment condition control, and preferably, the metal oxide layer has a thickness of 0.01 to 300 μm, preferably 0.02 to 100 μm. At this time, when the thickness of the metal oxide layer is less than 0.01 μm, the thickness may be too thin to include sufficient variable material in the pores, making it difficult to change and control the expression color, and when the thickness of the metal oxide layer exceeds 300 μm, there may be a problem that mechanical strength is lowered, and therefore, it is preferable that the metal oxide layer is formed with the above thickness.

In addition, the metal oxide layer has a plurality of pores, and the pores have an average depth of 0.01 to 100 μm, preferably, an average depth of 0.1 to 10 μm, which is advantageous in terms of containing an appropriate amount of variable material.

In addition, the inlet of the pores has an average diameter of about 0.01 to 3 μm, and preferably an average diameter of about 0.05 to 1.4 μm. In this case, when the average diameter of the pore inlet is less than 0.01 μm, there may be a problem in that it is difficult to form a variable material in the pore, and when the average diameter of the pore inlet is more than 3 μm, there may be a problem in that the structural color is not realized.

The variable material formed in the pores of the structural color variable photonic crystal composite material of the present invention may include one or more polymers selected from PMMA (Polymethyl methacrylate), PS (Polystyrene), PAA (Poly acrylic acid), PAM (Poly acrylic amide), PDMS (Poly dimethylsiloxane), PHEMA (Poly(2-hydroxyethyl methacrylate)) and APBA (aminophenylboronic acid).

In addition, the polymer may be impregnated with one or more metal oxides selected from $TiO_2$, $SiO_2$, ZnO, ZnS, $Fe_2O_3$, $Fe_3O_4$, $SnO_2$, CuO, $WO_3$, $CoFe_2O_4$ and $MnFe_2O_4$.

The structural color variable photonic crystal composite material of the present invention as described above can be prepared by performing the steps including: a first step of surface-treating the surface of a metal to form a metal oxide layer and pores; and a second step of forming a variable material in the pores.

The metal and the variable material are the same as described above.

The surface treatment of the first step may be performed by one or more surface treatment methods selected from an anodizing method, a plasma electrolytic oxidation method, and an etching method.

The second step may be performed by one or more methods selected from an impregnation method, an in situ polymerization method, and a melting casting method to form a variable material in the pores.

Hereinafter, the present invention will be described in more detail through examples, but the following examples are not intended to limit the scope of the present invention and should be construed as aiding the understanding of the present invention.

EXAMPLES

Example 1: Preparation of Variable Photonic Crystal Composite Material Including Hydrogel (1) Preparation of a Metal Having a Porous Metal Oxide Layer Formed on its Surface An ASTM B348 Ti grade 1 (100 mm×100 mm×5 mm) specimen was prepared for forming a porous metal oxide layer.

For pre-treatment of the specimen, it was degreased for 7 minutes in a degreasing solution of 7 wt % concentration based on an aqueous alkali solution to remove impurities within the surface and then washed with water.

Next, the washed specimen was immersed in an acid aqueous solution including 20 wt % of nitric acid and 3 wt % of hydrofluoric acid for 1 minute to 1 minute and 30 seconds to completely remove the natural oxide film and desmut, and then washed with water.

Next, after the specimen on which the water washing process has been completed was put into an electrolyzer containing an aqueous solution of sulfuric acid having a concentration of 15 wt %, a voltage was applied at 70V for 5 minutes to form a porous metal oxide layer on the surface of the specimen by an anodizing method.

(2) Preparation of Variable Photonic Crystal Composite Material

A 2 M precursor containing 0.15 M of MMA (Methacrylic acid), 7.5 wt % of bis-acrylamide and 1 wt % of a photoinitiator was prepared.

After impregnating the precursor into the specimen on which the porous metal oxide layer is formed, by irradiation with ultraviolet light to allow the hydrogel to be formed by polymerization in the pores formed in the porous metal oxide layer of the specimen, a structural color variable photonic crystal composite material including the hydrogel in pores of the porous metallic oxide layer was prepared.

Example 2: Preparation of Variable Photonic Crystal Composite Material Including PS-b-P2VP Copolymer (1) Preparation of a Metal Having a Porous Metal Oxide Layer Formed on its Surface A metal specimen having a porous metal oxide layer formed on its surface was prepared by performing the same method and steps using the same specimen as in Example 1.

(2) Preparation of Variable Photonic Crystal Composite Material

In a solution including 5 wt % of PS-b-P2VP (Polystryrene-v-poly(2-vinyl pyridine) diblock copolymer) and the remainder as the solvent propylene glycol monomethyl ether acetate, after impregnation of the specimen having a porous metal oxide layer formed on its surface, heat treatment was performed at 58° C. for 24 hours to prepare a structural color variable photonic crystal composite material.

Example 3: Preparation of Structural Color Variable Photonic Crystal Composite Material Including Polymer Impregnated with Nanoparticles (1) Preparation of a Metal Having a Porous Metal Oxide Layer Formed on its Surface A metal specimen having a porous metal oxide layer formed on its surface was prepared by performing the same method and steps using the same specimen as in Example 1.

(2) Preparation of Variable Photonic Crystal Composite Material

A solution including 1 M of NaAMPS (2-acrylamido-2-methyl-propane sulfonic acid sodium salt) monomers, 15 mol % of an MBAA (N,N'-Methylenebisacrylamide) crosslinking agent, 0.1 mol % of α-oxoglutaric acid, and $Fe_3O_4$ nanoparticles having a size of 100 nm was impregnated into the specimen having a porous metal oxide layer formed on its surface, and then polymerized in 365 nm UV for 12 hours to prepare a structural color variable photonic crystal composite material.

Experimental Example 1: Structural Color Change of Variable Photonic Crystal Composite Material According to Temperature Change In the structural color variable photonic crystal composite material of Example 1, when the external temperature increases, the hydrogel inside the pores contracts and the structural color changes. The change in structural color according to the temperature change was measured, and the results are shown in Table 1 below.

TABLE 1

| Classification | 25° C. | 30° C. | 40° C. | 50° C. |
|---|---|---|---|---|
| Example 1 | Orange | Green | Blue | Purple |

Experimental Example 2: Structural Color Change of Variable Photonic Crystal Composite Material According to Voltage When a voltage is applied by connecting electrodes to both ends of the composite material of Example 2, the P2VP layer in the PS-b-P2VP copolymer expands and the structural color changes. The change in structural color according to the voltage change is as follows.

TABLE 2

| Classification | 0 V | 1.5 V | 2.0 V | 2.5 V |
|---|---|---|---|---|
| Example 2 | Purple | Blue | Blue green | Orange |

Experimental Example 3: Structural Color Change of Variable Photonic Crystal Composite Material According to Magnetism When a neodymium magnet is brought close to the composite material of Example 3, the distance between the $Fe_3O_4$ nanoparticles in the polymer is changed due to the magnetism, and thus the structural color changes. The change in structural color according to the distance between the magnet and the composite material is as follows.

TABLE 3

| Classification | No magnetism | 40 mm | 25 mm | 10 mm |
|---|---|---|---|---|
| Example 3 | Brown | Blue green | Blue | Purple |

Although one embodiment of the present invention has been described above, the spirit of the present invention is not limited to the embodiment presented herein, and those skilled in the art, having an understanding of the scope of the invention, will readily suggest other embodiments by alterations, deletions, additions, etc., of components within the same spirit, which are also intended to fall within the spirit of this invention.

What is claimed is:

1. A structural color variable photonic crystal composite material, including:
   a metal having a metal oxide layer formed on its surface, wherein:
   the metal oxide layer is a porous layer including a plurality of pores, and includes a variable material that swells and contracts within the pores by external stimulation;
   the metal includes a titanium-based alloy:
   the external stimulation includes stimulation by one or more external stimuli selected from electricity, magnetism, temperature, and humidity;
   the variable material includes:
   a hydrogel polymerized from precursors containing MMA (Methacrylic acid), bis-acrylamide and a photoinitiator,
   a composite material formed by heat treating a first solution including PS-b-P2VP (Polystyrene-b-poly(2-vinyl pyridine) diblock copolymer), and propylene glycol monomethyl ether acetate, or
   a polymer formed by polymerizing a second solution with ultraviolet light (UV), the second solution including NaAMPS (2-acrylamido-2-methyl-propane sulfonic acid sodium salt) monomers, MBAA (N,N'-Methylenebisacrylamide) crosslinking agent, and α-oxoglutaric acid.

2. The structural color variable photonic crystal composite material according to claim 1, wherein the variable material is impregnated with the metal oxide layer in the polymer, the metal oxide layer includes one or more selected from $TiO_2$, $SiO_2$, ZnO, ZnS, $Fe_2O_3$, $Fe_3O_4$, $SnO_2$, CuO, $WO_3$, $CoFe_2O_4$ and $MnFe_2O_4$.

3. The structural color variable photonic crystal composite material according to claim 1, wherein
   the metal oxide layer is formed to have a thickness of 0.01 to 300 μm, and
   the pores have an average depth of 0.1 to 100 μm, and the inlets of the pores have an average diameter of 0.01 to 3 μm.

4. A method of manufacturing a structural color variable photonic crystal composite material according to claim 1, including:
   a first step of surface-treating the surface of a metal to form a metal oxide layer and pores; and
   a second step of forming a variable material in the pores.

5. The method of claim 4, wherein the surface treatment is performed by one or more surface treatment methods selected from an anodizing method, a plasma electrolytic oxidation method, and an etching method.

6. The method of claim 4, wherein the second step is performed by one or more methods selected from an impregnation method, an in situ polymerization method, and a melting casting method.

* * * * *